(12) United States Patent
Sawada et al.

(10) Patent No.: US 11,831,259 B2
(45) Date of Patent: Nov. 28, 2023

(54) MOTOR CONTROL APPARATUS (71) Applicant: Mitsubishi Electric Corporation, Tokyo (JP)

(72) Inventors: Akihiro Sawada, Tokyo (JP); Yuichi Muramoto, Tokyo (JP); Makoto Matsumoto, Tokyo (JP); Hiroki Uchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/682,136

(22) Filed: Feb. 28, 2022

(65) Prior Publication Data
US 2022/0321035 A1 Oct. 6, 2022

(30) Foreign Application Priority Data
Mar. 31, 2021 (JP) .................................. 2021-059534

(51) Int. Cl.
*H02P 1/04* (2006.01)
*H02P 1/10* (2006.01)

(52) U.S. Cl.
CPC ..................................... *H02P 1/10* (2013.01)

(58) Field of Classification Search
CPC .......... H02P 1/10; H02P 27/06; H02P 29/027; H02P 29/032
See application file for complete search history.

(56) References Cited

U.S. PATENT DOCUMENTS

2020/0185954 A1 6/2020 Song et al.
2022/0189719 A1* 6/2022 Isaji .......................... H02G 3/16

FOREIGN PATENT DOCUMENTS

| CN | 114243876 A | * 3/2022 |
| JP | 2015-216776 A | 12/2015 |
| JP | 2020-137196 A | 8/2020 |
| JP | 2020-528254 A | 9/2020 |

OTHER PUBLICATIONS

Communication dated May 24, 2022 from the Japanese Patent Office in Application No. 2021-059534.
Notification of Reasons for Refusal dated Apr. 25, 2023 from the Japanese Patent Office in application No. 2021-059534.

* cited by examiner

*Primary Examiner* — Karen Masih
(74) *Attorney, Agent, or Firm* — Sughrue Mion, PLLC; Richard C. Turner (57) ABSTRACT Provided is a motor control apparatus that suppresses a steep rush current to a charging circuit and that can quickly start driving of a motor without depending on a current-limiting resistor. The motor control apparatus according to the present disclosure includes an inverter for driving a motor, a charging circuit for supplying electric power to the inverter, a relay circuit for connecting a charging circuit and a power supply terminal, a control unit for controlling the inverter and the relay circuit, and a pre-charging circuit that is provided in parallel with the relay circuit, that starts charging from the power supply terminal to the charging circuit after a power switch for connecting an external power source with the power supply terminal is turned on, and that completes charging of the charging circuit before the control unit starts operation thereof.

9 Claims, 8 Drawing Sheets

MOTOR CONTROL APPARATUS

BACKGROUND OF THE INVENTION

Field of the Invention

The present disclosure relates to a motor control apparatus.

Description of the Related Art

In a vehicle such as an automobile, motors are utilized for driving a large number of subsystems such as an engine starting apparatus, a throttle actuator, an electric power steering apparatus, and a radiator fan. In recent years, due to an increase in the output of a motor, a charging circuit such as a large-capacity capacitor has often be provided at a front stage in the driving circuit of a motor control apparatus. Such a charging circuit is provided as a countermeasure for stabilizing a power-source voltage at a time when energization currents to the motor coils are switched and hence a large current flows.

In order for the driving circuit of the motor control apparatus to start driving of the motor, it is required that at first, such a charging circuit is charged. When an excessive rush current flows into a high-capacity charging circuit, loads on the wiring leads of the power source and the power-source circuit become large. Accordingly, in order to suppress the rush current to the charging circuit at a time when the motor control apparatus starts, pre-charging of the charging circuit is required.

In many cases, a pre-charging circuit utilizing a current-limiting resistor is provided for limiting a current, so that an excessive rush current is prevented. However, when the capacity of the charging circuit increases, use of the current-limiting resistor makes the time required for pre-charging longer and hence there occurs a problem that the start of motor driving is delayed.

With regard to this problem, there has been proposed a technology in which in the case where when a motor is started, pre-charging has not been completed, a power source is connected directly with a charging circuit of a motor control apparatus by bypassing a current-limiting resistor. The pre-charging of the charging circuit can be accelerated by connecting the power source directly with the charging circuit of the motor control apparatus (for example, Patent Document 1).

PRIOR ART REFERENCE

Patent Document

[Patent Document 1] Japanese Patent Application Laid-Open No. 2020-137196

SUMMARY OF THE INVENTION

In Patent Document 1, a higher-hierarchy ECU (Engine Controller Unit) controls a relay in the pre-charging circuit and a relay in the circuit for bypassing the pre-charging circuit so as to connect the power source directly with the charging circuit. However, the time in which the higher-hierarchy ECU starts is not referred to. It takes a predetermined time for the higher-hierarchy ECU to start from a time when the power switch (referred to also as the main switch) of a vehicle is turned on. Because after being started, the higher-hierarchy ECU controls the relay for bypassing the foregoing pre-charging circuit so as to promote pre-charging, the time for the higher-hierarchy ECU to start is added to a delay time in pre-charging.

In order to shorten the time for the motor driving to start, it is required that the starting time of the higher-hierarchy ECU is also considered. It is required to shorten the total time in which the power switch of the vehicle is turned on, the power-source voltage is applied to the motor control apparatus and the charging circuit is charged, and then motor driving is started.

The same requirements are applied to the case where in order to downsize the motor control apparatus, not a signal from the higher-hierarchy ECU but a control unit in the motor control apparatus controls the relay. That is to say, the relay is controlled by executing the sequence in which after a predetermined reset time elapses from a time when the control unit in the motor control apparatus starts, a microprocessor starts its processing, and then the pre-charging circuit is started. In that case, as is the case with the waiting time in which a signal from the higher-hierarchy ECU to the relay is waited for, a waiting time in which a signal from the control unit to the relay is waited for occurs after the power source is turned on.

The present disclosure has been implemented in order to solve the foregoing problems; the objective thereof is to provide a motor control apparatus that suppresses a steep rush current to the charging circuit, that shortens the time from a time point when the power source is turned on through a power switch to a time point when pre-charging is completed, and that can quickly start driving of a motor without depending on a current-limiting resistor.

A motor control apparatus according to the present disclosure includes
an inverter for driving a motor,
a charging circuit for supplying electric power to the inverter,
a relay circuit for connecting a charging circuit and a DC power source,
a control unit for controlling the inverter and the relay circuit, and
a pre-charging circuit that is provided in parallel with the relay circuit, that starts charging from the DC power source to the charging circuit after a power switch for connecting an external power source with the DC power source is turned on, and that completes charging of the charging circuit before the control unit starts operation thereof.

A motor control apparatus according to the present disclosure makes it possible to suppress a steep rush current to the charging circuit, to shorten the time from a time point when the power source is turned on through a power switch to a time point when pre-charging is completed, and to quickly start driving of a motor without depending on a current-limiting resistor.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Hereinafter, Embodiments of a motor control apparatus according to the present disclosure will be explained with reference to the drawings.

1. Embodiment 1

<Configuration of Motor Control Apparatus>

Figure 1:
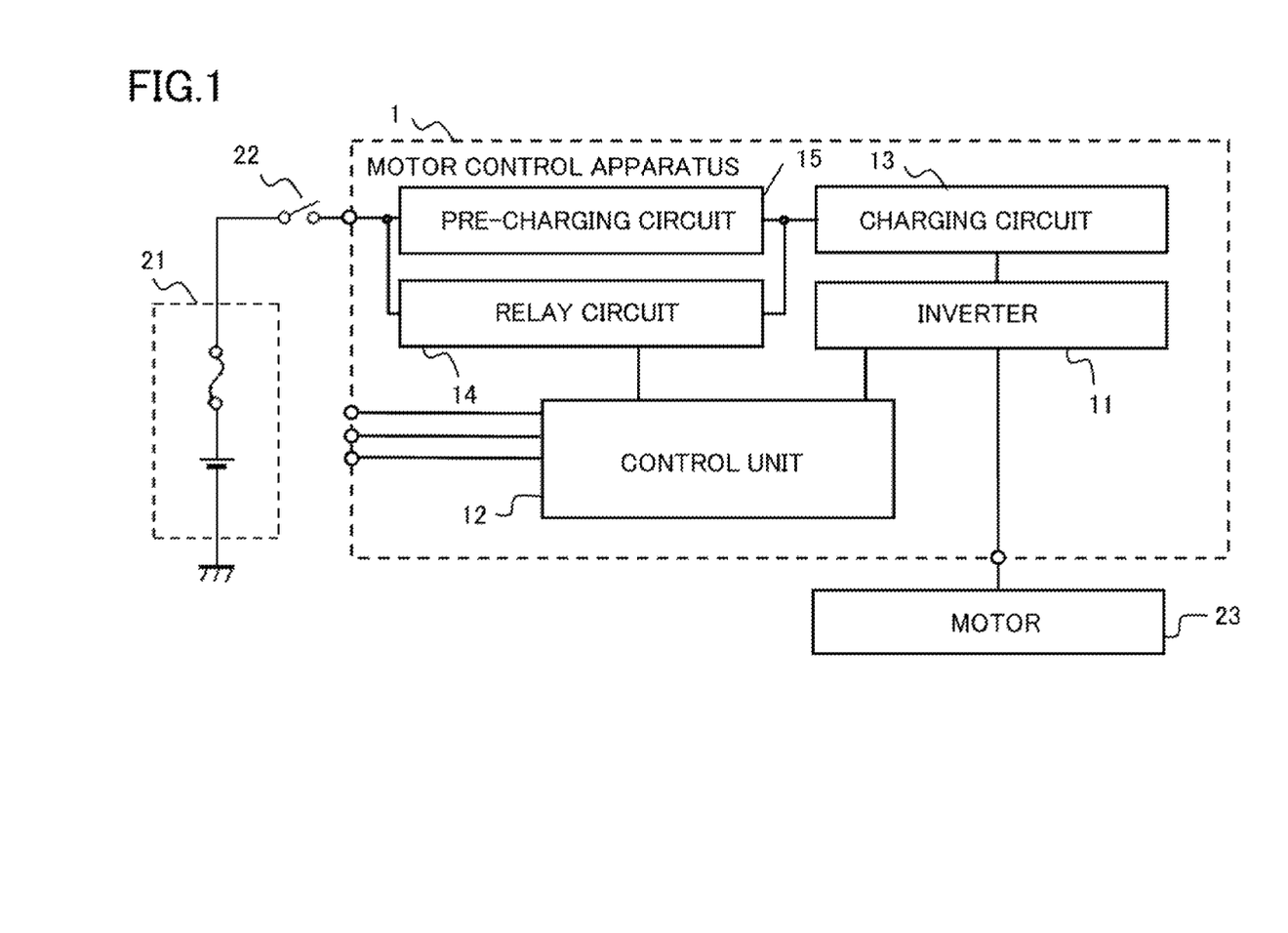
FIG. 1 is a configuration diagram of a motor control apparatus according to Embodiment 1.

FIG. 1 is a configuration diagram of a motor control apparatus according to Embodiment 1. A motor control apparatus 1 includes an inverter 11, a control unit 12, a charging circuit 13, a relay circuit 14, a pre-charging circuit 15, and the like.

An external power source 21 is connected with a power-supply terminal of the motor control apparatus 1 by way of a power switch 22. After the power switch 22 is turned on, electric power of the external power source 21 is supplied to the motor control apparatus 1. A motor 23 is a load on the motor control apparatus 1 and is controlled by the motor control apparatus 1. The inverter 11 supplies AC electric power to the motor 23 so as to drive it. In FIG. 1, there has been explained that the load on the motor control apparatus 1 is the motor 23; however, it may be allowed that an electric rotating machine that functions as a motor and an electric power generator is the load. The control subjects of the motor control apparatus 1 includes an electric rotating machine.

<Inverter>

Figure 2:
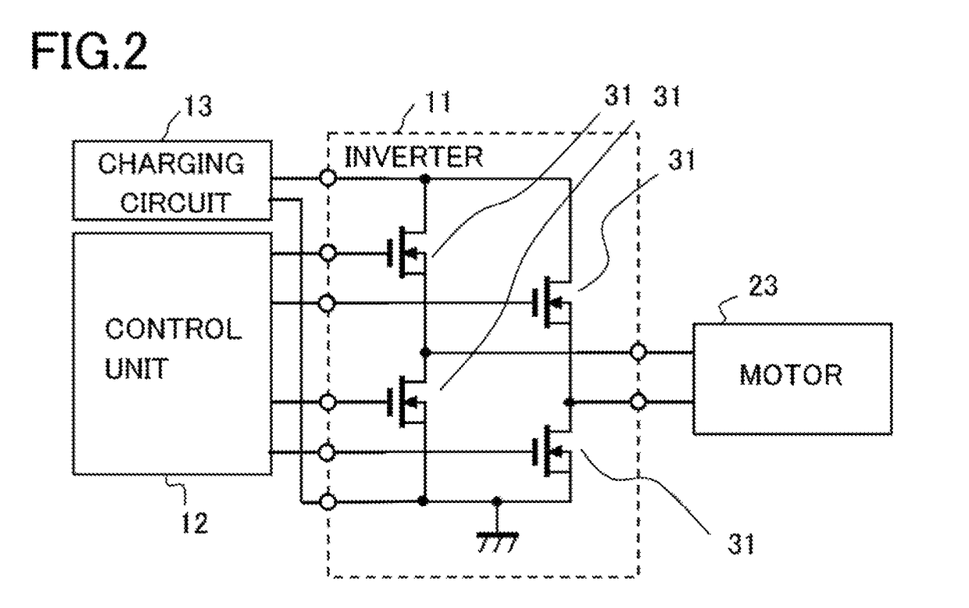
FIG. 2 is a configuration diagram of an inverter in the motor control apparatus according to Embodiment 1.

FIG. 2 is a configuration diagram of the inverter 11 in the motor control apparatus 1 according to Embodiment 1. The inverter 11 is a circuit for supplying AC electric power to the motor 23. Specifically, in the inverter 11, there is configured a bridge circuit provided with upper arms and lower arms formed of respective switching devices 31. The inverter 11 performs conversion between a direct current and an alternating current.

In the case where the inverter 11 controls the motor 23, ON/OFF of the switching device 31 is switched so that a current flowing in the coil of the motor is changed. Accordingly, a charging circuit 13 for supplying electric power to the inverter 11 is provided.

FIG. 2 represents an example in which the motor 23 is a two-phase AC motor; however, for a 3- or higher-phase AC motor, a configuration having more switching devices 31 is utilized. As the switching device 31, for example, an IGBT (Insulated Gate Bipolar Transistor), a MOSFET (Metal Oxide Semiconductor Field Effect Transistor), a transistor, or the like is utilized.

<Charging Circuit>

The charging circuit 13 is a circuit for supplying DC electric power to the inverter 11. The charging circuit 13 is configured with a high-capacity aluminum electrolytic capacitor, an electric double layer capacitor, a lithium ion battery, or the like. The capacitor, the battery, or the like of the charging circuit 13 makes it possible to instantaneously supply electric power to the inverter and contributes to stabilization of the power-source voltage.

<Hardware Configuration of Control Unit>

Figure 3:
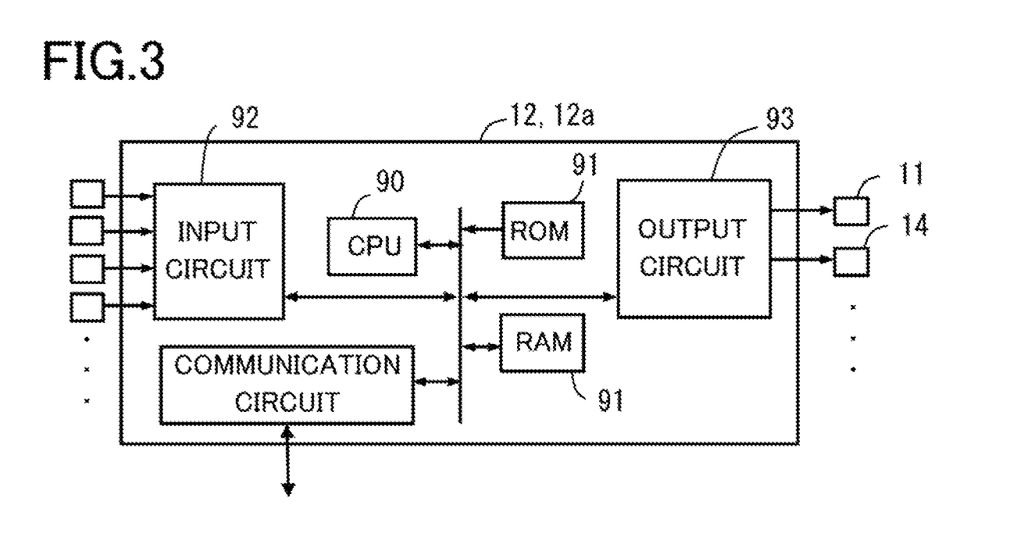
FIG. 3 is a hardware configuration diagram of a control unit in the motor control apparatus according to Embodiment 1.

FIG. 3 is a hardware configuration diagram of the control unit 12 in the motor control apparatus 1 according to Embodiment 1. The hardware configuration in FIG. 3 can be applied also to the control unit 12a; however, in the following explanation, the control unit 12 will be explained as a representative. In the present embodiment, the control unit 12 is an electronic control apparatus for controlling the motor control apparatus 1. Respective functions of the control unit 12 are realized by processing circuits provided therein. Specifically, as illustrated in FIG. 3, the control unit 12 includes, as the processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

It may be allowed that as the computing processing unit 90, an ASIC (Application Specific Integrated Circuit), an IC (Integrated Circuit), a DSP (Digital Signal Processor), an FPGA (Field Programmable Gate Array), each of various kinds of logic circuits, each of various kinds of signal processing circuits, or the like is provided. In addition, it may be allowed that as the computing processing unit 90, two or more computing processing units of the same type or different types are provided and respective processing items are executed in a sharing manner. As the storage apparatuses 91, there are provided a RAM (Random Access Memory) that can read data from and write data in the computing processing unit 90, a ROM (Read Only Memory) that can read data from the computing processing unit 90, a flash memory, and the like. The input circuit 92 is connected with various kinds of sensors, switches, and communication lines and is provided with an A/D converter, a communication circuit, and the like for inputting communication information and output signals from the sensors and the switches to the computing processing unit 90. The output circuit 93 is connected with electric loads and includes the inverter 11 and the relay circuit 14. These electric loads include, for example, a driving circuit for outputting a control signal from the computing processing unit 90. The computing processing unit 90 can communicate with external apparatuses through a communication circuit.

The computing processing unit 90 runs software items (programs) stored in the storage apparatus 91 such as a ROM and collaborates with other hardware devices in the control unit 12, such as the storage apparatus 91, the input circuit 92, and the output circuit 93, so that the respective functions provided in the control unit 12 are realized. Setting data items such as a threshold value and a determination value to be utilized in the control unit 12 are stored, as part of software items (programs), in the storage apparatus 91 such as a ROM.

Each of the respective functions of the control unit 12 may be configured with a software module. However, each of the respective functions of the control unit 12 may also be configured with a combination of software and hardware.

In the control unit 12, when a predetermined reset period elapses after the power switch 22 has been turned on and the external power source 21 has supplied a power source to the motor control apparatus 1, the computing processing unit 90 starts its operation. Then, the computing processing unit 90 executes read software, so that control of the outputs of the control unit is started. Accordingly, the outputs to the inverter 11, the relay circuit 14, and the like are controlled.

Depending on the type of the motor control apparatus 1, diverse input signals are inputted to the control unit 12. In accordance with the input signal, the motor control apparatus 1 controls the motor 23 through the inverter 11. For example, in the case of the motor control apparatus 1 for an electric power steering apparatus, the motor control apparatus 1 outputs a driving signal for controlling the motor 23 for the input signals from a torque sensor, a vehicle speed sensor, and the like.

<Relay Circuit>

The relay circuit 14 is operated by the control unit 12. The relay circuit 14 is a circuit for continuously supplying electric power from the external power source 21 to the charging circuit 13 after the relay has been turned on by the control unit 12.

In the case where when the charging circuit 13 has not been charged, the charging circuit 13 is connected with the external power source 21, a rush current to the charging circuit 13 occurs and a large current flows therein. At this time, the wiring leads of the relay circuit and the peripheral circuits thereof may be worn by an excessive current and may shorten their lifetimes. Moreover, the occurrence of a rapid excessive current makes the voltage of the charging circuit 13 overshoot and hence the lifetimes of the charging circuit 13 and the apparatuses (for example, the inverter 11) at the post stage thereof may be shortened.

In some cases, there is implemented a countermeasure in which in order to suppress a rush current to the charging circuit 13, caused by the operation of the relay circuit 14, an another-route relay circuit into which a serial current-limiting resistor is inserted is provided and is made to operate in advance. Such an action for preliminarily charging the charging circuit 13 is referred to as pre-charging.

By implementing pre-charging by use of the another-route relay circuit into which a serial current-limiting resistor is inserted, there can be solved the problem of a rush current to the charging circuit 13 at a time when the operation of the relay circuit 14 is started thereafter. However, there are posed problems that use of the current-limiting resistor delays the time in which the pre-charging is started and then is completed and that there occurs a delay time required for the control unit 12 to start control of the another-route relay. That is because due to these delay times, the time point at which the motor control apparatus 1 starts the motor 23 is delayed. In Embodiment 1, in order to solve this problem, the pre-charging circuit 15, explained later, is provided.

<Pre-Charging Circuit>

Figure 4:
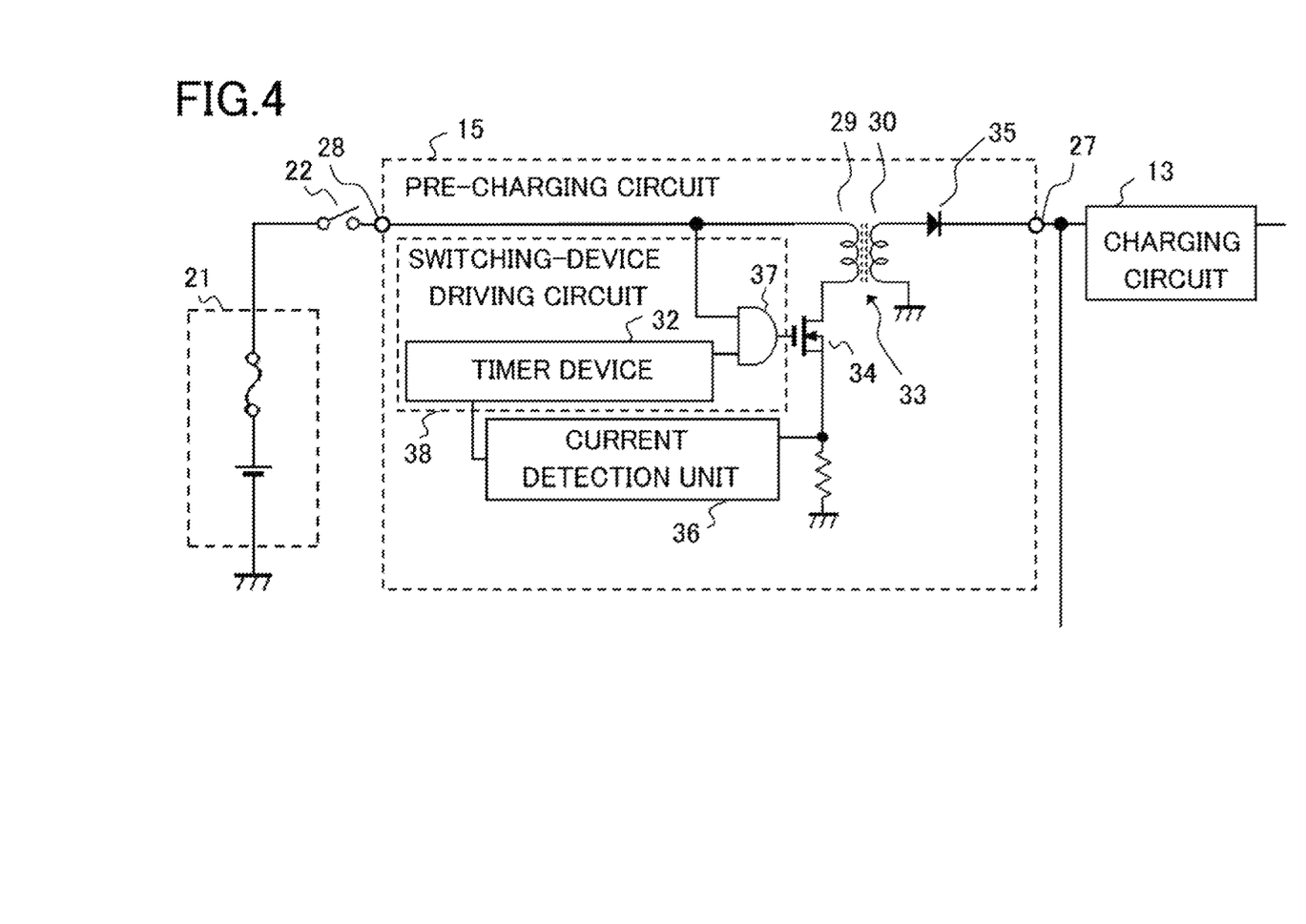
FIG. 4 is a configuration diagram of a pre-charging circuit in the motor control apparatus according to Embodiment 1.

FIG. 4 is a configuration diagram of the pre-charging circuit 15 in the motor control apparatus 1 according to Embodiment 1. When being supplied with a power source by the external power source 21 after the power switch 22 of the vehicle is turned on, the pre-charging circuit 15 supplies electric power to the charging circuit 13 so as to charge it. Charging of the charging circuit 13 can be completed by the pre-charging circuit 15 before the relay circuit 14 operates. Thus, the motor control apparatus 1 can immediately make preparations for starting of driving the motor 23.

A delay time occurs in the time period in which when a predetermined reset period elapses after the power switch 22 has been turned on and the external power source 21 has supplied a power source to the motor control apparatus 1, the computing processing unit 90 starts its operation. After this delay time, the control unit 12 starts driving control of the motor 23 through the inverter 11. Accordingly, preliminary charging of the charging circuit 13 before the starting of the driving control makes it possible to start driving of the motor 23 without delay.

A power-supply terminal 28 of the pre-charging circuit 15 is connected with the external power source 21 by way of the power switch 22. The pre-charging circuit 15 includes a primary coil 29 connected with the external power source 21, a secondary coil 30 magnetically coupled with the primary coil 29, and a rectifier diode 35 that connects the secondary coil 30 with the charging circuit 13. The pre-charging circuit 15 is connected with the charging circuit 13 at a charging terminal 27. A step-up transformer 33 includes the primary coil 29 and the secondary coil 30 magnetically coupled with the primary coil 29.

The pre-charging circuit 15 includes a switching device 34 for turning on or off energization of the primary coil 29 and a switching-device driving circuit 38 for making the switching device 34 perform on/off-control. A change in magnetic flux produced in the primary coil 29 can generate a flyback voltage across the secondary coil 30. The pre-charging circuit 15 charges the charging circuit 13 with a secondary current produced through the generation of the flyback voltage.

The switching-device driving circuit 38 performs on/off-control of the switching device 34 by means of an AND circuit 37 and a timer device 32. When a drain current of the switching device 34 exceeds a predetermined determination current, the timer device 32 turns off the switching device 34 for a specific time period and then turns on it again. The foregoing method makes it possible that while preventing the output from conspicuously rising when the power-source voltage is high and preventing the output from conspicuously falling when the power-source voltage is low, the switching device 34 is turned on or off.

The pre-charging circuit 15 is provided with a current detection unit 36 for detecting a drain current of the switching device 34. The pre-charging circuit 15 configures a switching-type converter that detects an inputted current and performs switching operation. The pre-charging circuit 15 can prevent an excessive rush current from flowing, by supplying a specific current to the post-stage charging circuit 13. In addition, it may be allowed that by use of the timer device 32, there is separately determined the time period in which the power switch 22 is turned on, the pre-charging circuit starts its operation, and then the pre-charging circuit ends the operation.

It is made possible that the pre-charging time and the pre-charging current are appropriately set and the pre-charging is completed before the control unit 12 starts its processing. With the foregoing method, the pre-charging has definitely been completed at a time when the control of the motor 23 starts. Therefore, the control of the motor 23 can be started without delay.

In FIG. 4, although configured with the AND circuit 37 and the timer device 32, the switching-device driving circuit 38 is not limited to such a specific example. The switching-device driving circuit 38 may also be configured with an oscillator, a comparator, a timer, and a logic circuit. Moreover, it may also be allowed that an oscillator capable of changing a duty ratio is utilized and the duty ratio of an ON/OFF signal is changed in accordance with the amount of an average drain current of the switching device 34, so that the output current of the step-up transformer 33 is changed.

Specifically, when the primary current flowing in the primary coil 29 exceeds a second determination value, the On-duty ratio of the on/off-control is decreased. The foregoing method makes it possible that the pre-charging is performed with an appropriate pre-charging current for a voltage change in the external power source 21 and variations in the primary coil 29, the secondary coil 30, and other components. Accordingly, the pre-charging of the charging circuit 13 can be completed in a short time while an excessive charging current is suppressed.

<Operation of Pre-Charging Circuit>

Figure 5:
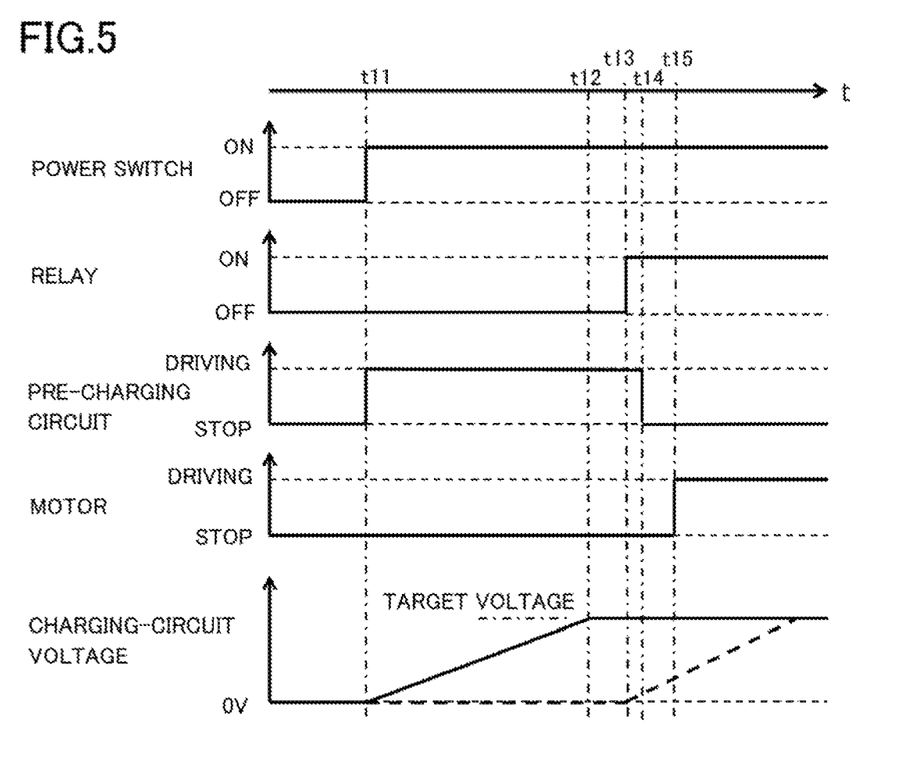
FIG. 5 is a timing chart for explaining the operation of the pre-charging circuit in the motor control apparatus according to Embodiment 1.

FIG. 5 is a timing chart for explaining the operation of the pre-charging circuit 15. At a time point t11 in FIG. 5, the power switch 22 is turned on and then the external power source 21 starts to supply electric power to the motor control apparatus 1. The pre-charging circuit 15 starts charging operation from the time point t11 and then stops the charging operation at a time point t12.

The timer device 32 sets the operation period of the pre-charging circuit 15, so that t12 is determined. The output of the AND circuit 37 on/off-drives the gate voltage of the switching device 34.

After that, at a time point t13, operational preparations of the control unit 12 are completed and then the relay circuit 14 is turned on. That is because when the motor 23 is driven, supply of electric power is performed by the relay circuit 14 for supplying large electric power.

At a time point t14, the operation of the pre-charging circuit 15 stops. While the motor 23 is driven by way of the inverter 11, the operation of the pre-charging circuit 15 is stopped. As a result, it is made possible to eliminate the effect, of a voltage change caused by driving the motor 23, that is provided to the pre-charging circuit 15.

After that, at a time point t15, driving of the motor 23 is started. Because at a time when the motor 23 is driven, the charging circuit 13 has been charged up to an enough voltage, the motor 23 can efficiently be driven.

In this situation, it may be allowed that the control unit 12 keeps the relay circuit 14 off until the driving of the motor 23 is started and that when starting the driving of the motor 23 through the inverter 11, the control unit 12 turns on the relay circuit 14. The relay circuit 14 is connected only when the driving of the motor 23 is necessary and the relay circuit 14 is not connected when the driving of the motor 23 is unnecessary, so that it is made possible to make preparations for a contingent short circuit.

The waveform of the charging-circuit voltage, which is indicated by a broken line at the lowermost position in the timing chart of FIG. 5, represents the charging operation in a comparative example at a time when the control unit 12 controls the pre-charging relay in which a current-limiting resistor is serially disposed. From the time point t13 at which the operational preparations of the control unit 12 is completed, charging is started through pre-charging.

At the time point t15, the charging-circuit voltage indicated by the broken line has not reached the target voltage. Accordingly, when the driving of the motor 23 starts, the charging circuit 13 cannot supply enough electric power thereto. Therefore, the motor control apparatus according to the comparative example cannot efficiently drive the motor 23.

2. Embodiment 2

<Configuration of Motor Control Apparatus>

Figure 6:
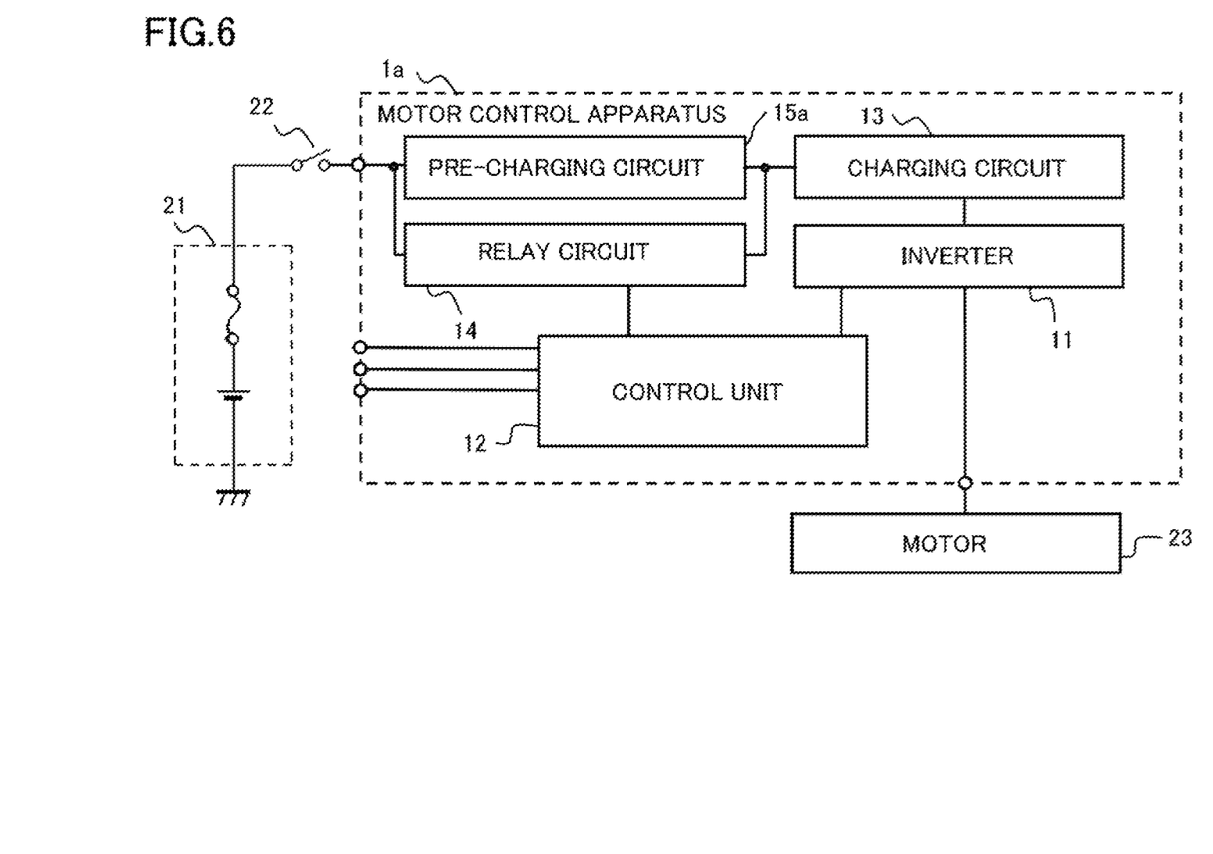
FIG. 6 is a configuration diagram of a motor control apparatus according to Embodiment 2.

FIG. 6 is a configuration diagram of a motor control apparatus 1a according to Embodiment 2. FIG. 6 is different from FIG. 1 according to Embodiment 1 in that a pre-charging circuit 15a replaces the pre-charging circuit 15. The explanations for the constituent components the same as those in Embodiment 1 will be omitted.

<Configuration of Pre-Charging Circuit>

Figure 7:
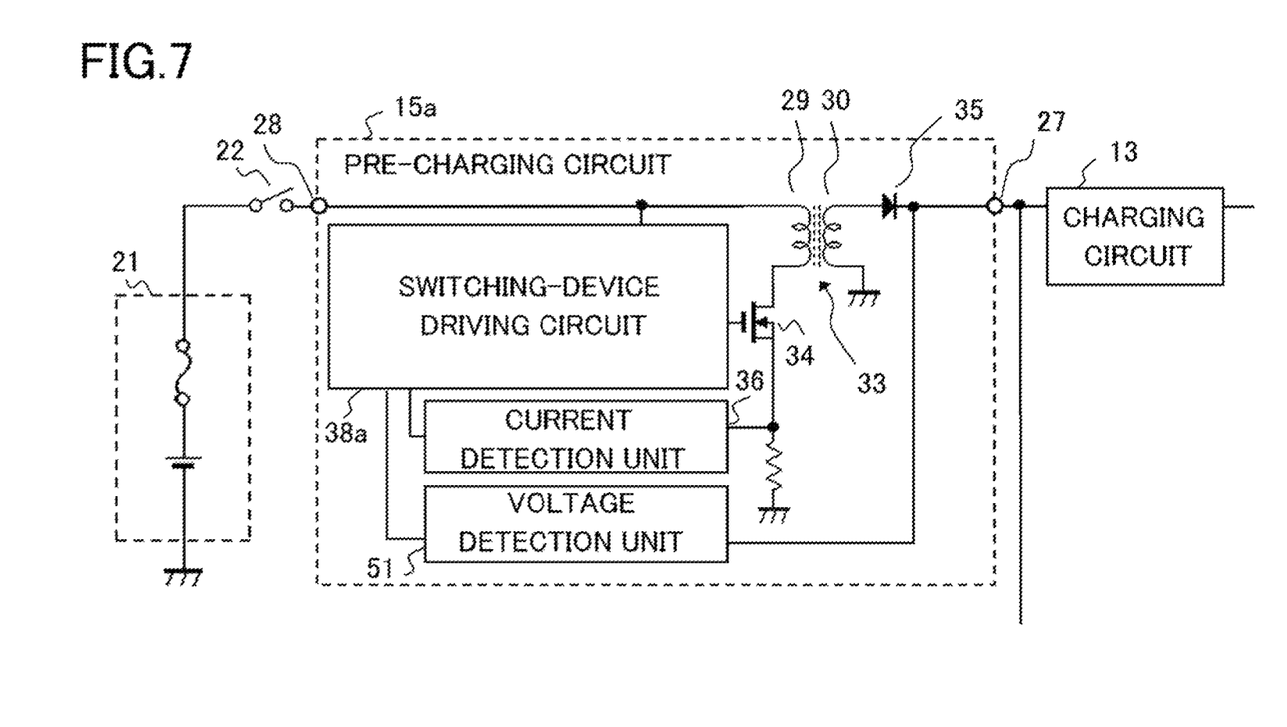
FIG. 7 is a configuration diagram of a pre-charging circuit in the motor control apparatus according to Embodiment 2.

FIG. 7 is a configuration diagram of the pre-charging circuit 15a in the motor control apparatus 1a according to Embodiment 2. In contrast to FIG. 4 according to Embodiment 1, a voltage detection unit 51 for monitoring a charging voltage of the charging circuit 13 is added in the pre-charging circuit 15a in FIG. 7. The voltage detection unit 51 can detect the charging voltage based on the output voltage, of the secondary coil 30 in the pre-charging circuit 15a, that is inputted thereto by way of the rectifier diode 35.

A switching-device driving circuit 38a is represented as a black box. Along with the current detection unit 36, the switching-device driving circuit 38a switches the control duty ratios for the switching device 34 in accordance with the output of the voltage detection unit 51. The explanations for the constituent components the same as those in Embodiment 1 will be omitted.

In the case where the charging voltage exceeds a predetermined determination voltage, the On-duty ratio of the ON/OFF signal to be outputted by the switching-device driving circuit 38a is decreased as the charging voltage increases. The foregoing method makes it possible to decrease the output of the pre-charging circuit 15a in accordance with the charging voltage.

As the charging voltage of the charging circuit 13 increases, the electric power to be supplied from the pre-charging circuit 15a can be decreased. Because unnecessary power consumption is reduced, that can contribute to raising the gasoline mileage. In the case where the motor control apparatus 1a does not immediately start the driving of the motor, the state where only the pre-charging circuit 15a is ON is continued without turning on the relay circuit 14; thus, because the low output is kept, that can contribute to raising the efficiency. Because it is made possible to make preparations for driving of the motor, while supplementing leakage currents leaking from the charging circuit 13, the inverter 11, and the like, the foregoing method is significant.

Moreover, it may be allowed that in the case where the charging voltage exceeds a predetermined second determination voltage, the pre-charging circuit 15a is stopped. Because it is determined that charging of the charging circuit 13 is sufficient and hence the loss of electric power caused by driving the charging circuit 13 can be reduced; thus, the foregoing method is significant.

<Operation of Pre-Charging Circuit>

Figure 8:
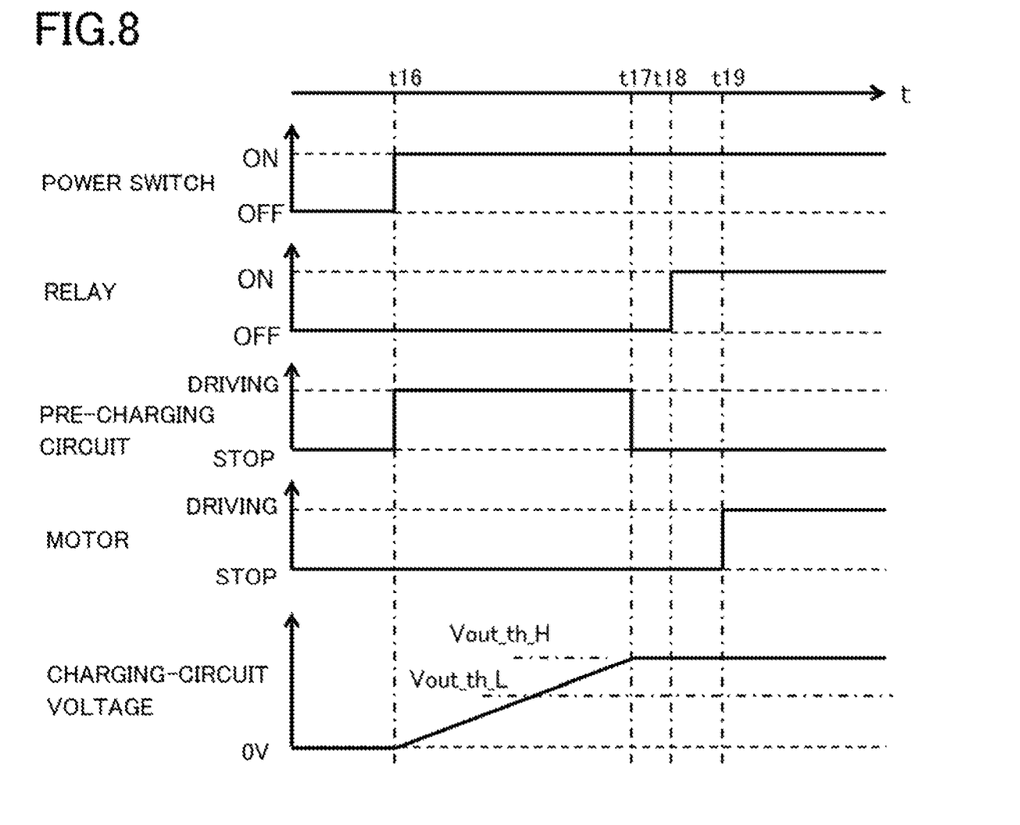
FIG. 8 is a timing chart for explaining the operation of the pre-charging circuit in the motor control apparatus according to Embodiment 2.

FIG. 8 is a timing chart for explaining the operation of the pre-charging circuit 15a in the motor control apparatus 1a according to Embodiment 2. At a time point t16 in FIG. 8, the power switch 22 is turned on.

At this time, the pre-charging circuit 15a starts its charging operation. At a time point t17, the charging voltage with which the charging circuit 13 is charged reaches a target voltage Vout_th_H; then, the operation of the pre-charging circuit 15a is stopped.

After that, at a time point t18, the relay circuit 14 is turned on. Then, at a time point t19, the inverter 11 starts the driving of the motor 23.

In this situation, the voltage detection unit 51, which determines whether or not the charging voltage has reached a target voltage, performs a determination with a hysteresis. That is to say, the voltage detection unit 51 maintains the determination that the charging voltage has reached the target voltage until the charging voltage becomes lower than a target voltage Vout_th_L. During a motor-driving period after the time point t19, which is after the time point at which the charging voltage has reached the target voltage Vout_th_H, the motor control apparatus 1*a* continues stopping the pre-charging circuit 15*a* from operating.

As a result, because the energy supply during the operation of the motor 23 can be performed by the relay circuit 14 for supplying large electric power, high-efficiency operation can be realized.

3. Embodiment 3

Figure 9:
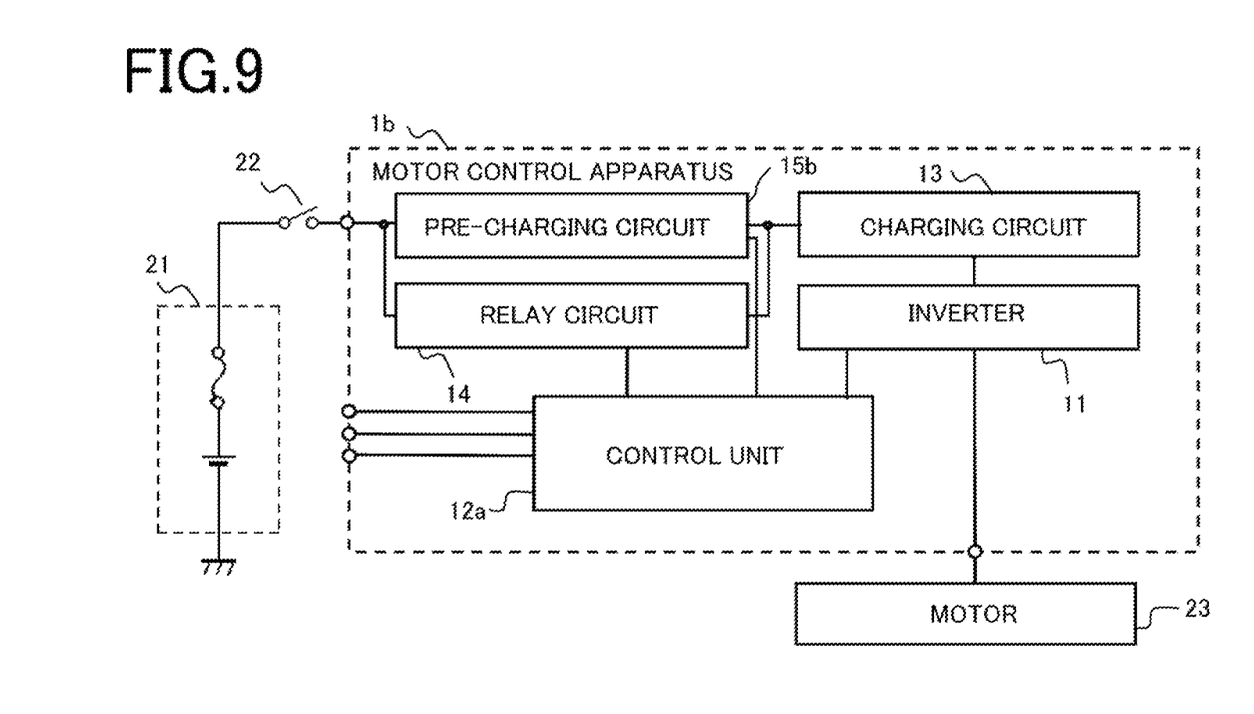
FIG. 9 is a configuration diagram of a motor control apparatus according to Embodiment 3.

FIG. 9 is a configuration diagram of a motor control apparatus 1*b* according to Embodiment 3. FIG. 9 is different from FIG. 6 according to Embodiment 2 in that a pre-charging circuit 15*b* is operated by a control unit 12*a*. The explanations for the constituent components the same as those in Embodiment 2 will be omitted.

In the control unit 12*a*, when a predetermined reset period elapses after the power switch 22 has been turned on and the external power source 21 has supplied a power source to the motor control apparatus 1*b*, the computing processing unit 90 starts its operation. Then, the computing processing unit 90 executes read software, so that control of the outputs of the control unit is started. Accordingly, the outputs to the inverter 11, the relay circuit 14, the pre-charging circuit 15*b*, and the like are controlled.

There can be configured in such a way that in the case where a predetermined reset period elapses after the control unit 12*a* has been started and then the computing processing unit 90 starts its operation, a signal for stopping the pre-charging circuit 15*b* from operating is transmitted to the pre-charging circuit 15*b*. The foregoing method makes the pre-charging circuit 15*b* operate only during a non-operation period of the control unit 12*a*. It may be allowed that as the foregoing signal, a reset-terminal signal of the computing processing unit 90 is outputted as it is and that when the computing processing unit 90 is being reset, the pre-charging circuit 15*b* is permitted to operate and that when the reset of computing processing unit 90 is being cancelled, the pre-charging circuit 15*b* is stopped from operating.

Through the foregoing method, the pre-charging circuit 15*b* is utilized only when the control unit 12*a* does not function; thus, role-sharing is clarified.

In addition, it may be allowed that at an arbitrary timing, the control unit 12*a* transmits the signal for stopping the pre-charging circuit 15*b* from operating. It may be allowed that the pre-charging circuit 15*b* continues to operate until the control unit 12*a* determines a predetermined operation condition and then starts the driving of the motor 23. Until the driving of the motor 23 is started, the relay circuit 14 is kept off and the operation of the pre-charging circuit 15*b* is continued, so that the pre-charging circuit 15*b* is made to continue the charging of the charging circuit 13.

As described above, it may be allowed that leakage currents related to the charging circuit 13, the inverter 11, and the like are supplied by the pre-charging circuit 15*b*. The foregoing method is significant because it contributes to reduction of power consumption. Moreover, the relay circuit 14 is connected only when the driving of the motor 23 is necessary and the relay circuit 14 is not connected when the driving of the motor 23 is unnecessary, so that it is made possible to make preparations for a contingent short circuit.

Each of Embodiments according to the present disclosure can be applied to not only an automobile but also a motorized bicycle, a motorcycle, a riding-type agricultural machine, a riding-type construction machine, or a powered vehicle.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

What is claimed is:

1. A motor control apparatus comprising:
an inverter for driving a motor;
a charging circuit that has a capacitor for supplying electric power stably to the inverter;
a relay circuit for connecting the charging circuit and a power supply terminal;
a controller that is supplied power when a power switch for connecting an external power source with the power supply terminal is turned on by an external operation, that starts operating after a reset period, and that controls the inverter and the relay circuit; and
a pre-charging circuit that is provided between the charging circuit and the power supply terminal in parallel with the relay circuit, that operates independently of the controller to start charging from the power supply terminal to the charging circuit after the power switch is turned on, and that completes the charging of the charging circuit before a time when the reset period of the controller elapses and the controller starts operation of the inverter.

2. The motor control apparatus according to claim 1, wherein the pre-charging circuit includes:
a primary coil connected with the power supply terminal,
a secondary coil magnetically coupled with the primary coil,
a diode for connecting the secondary coil with the charging circuit,
a switching device for turning on or off energization of the primary coil, and
a switching-device driving circuit that performs on/off-control of the switching device so that a secondary current is generated in the secondary coil by a change in magnetic flux generated in the primary coil, and charges the charging circuit with the secondary current.

3. The motor control apparatus according to claim 2, wherein in the case where a primary current flowing in the primary coil exceeds a predetermined determination current, the switching-device driving circuit of the pre-charging circuit turns off the switching device for a predetermined waiting time.

4. The motor control apparatus according to claim 2, wherein in the case where a voltage of the charging circuit exceeds a predetermined determination voltage, the switching-device driving circuit of the pre-charging circuit decreases an On-duty ratio in on/off-control of the switching device.

5. The motor control apparatus according to claim 1, wherein in the case where the voltage of the charging circuit exceeds a predetermined second determination voltage, the pre-charging circuit stops operation thereof.

6. The motor control apparatus according to claim 1, wherein the pre-charging circuit operates in the reset period of the controller.

7. The motor control apparatus according to claim 1, wherein the pre-charging circuit stops operation thereof before the controller starts control of the inverter.

8. The motor control apparatus according to claim 1, wherein when starting control of the inverter, the controller connects the inverter with the relay circuit.

9. The motor control apparatus according to claim 1, wherein the controller connects the inverter with the relay circuit after the reset period of the controller elapses.

* * * * *